United States Patent [19]

Uno et al.

[11] 4,097,876
[45] Jun. 27, 1978

[54] DUAL-MODE LIGHT METER SYSTEM FOR SLR CAMERA USING BEAM-SPLITTING REFLEX MIRROR

[75] Inventors: Naoyuki Uno, Urawa; Katsuhiko Miyata, Tsurugashima, both of Japan

[73] Assignee: Asahi Kogaku Kogyo Kabushiki Kaisha, Tokyo, Japan

[21] Appl. No.: 748,358

[22] Filed: Dec. 7, 1976

[30] Foreign Application Priority Data

Dec. 9, 1975 Japan .................................. 50-146675

[51] Int. Cl.² .......................... G03B 7/08; G03B 19/12
[52] U.S. Cl. .......................................... 354/31; 354/59; 354/154
[58] Field of Search .................... 354/23 R, 31, 50, 51, 354/53–57, 59, 154, 155, 219, 224, 225

[56] References Cited

U.S. PATENT DOCUMENTS

| 3,165,992 | 1/1965 | Ando ........................ 354/154 |
| 3,730,063 | 5/1973 | Kobayashi et al. ............ 354/31 |
| 3,791,276 | 2/1974 | Ueda et al. .................. 354/23 |
| 3,842,424 | 10/1974 | Tsunekawa et al. ............ 354/31 |
| 3,872,484 | 3/1975 | Hashimoto et al. ............ 354/56 X |
| 3,994,001 | 11/1976 | Maitani et al. .............. 354/51 |

FOREIGN PATENT DOCUMENTS

1,277,664   9/1968   Germany .............................. 354/154

*Primary Examiner*—L. T. Hix
*Assistant Examiner*—William B. Perkey
*Attorney, Agent, or Firm*—Sughrue, Rothwell, Mion, Zinn and Macpeak

[57] ABSTRACT

A light meter for a SLR camera implements both initial exposure time display and automatic exposure time control using a single light sensing element 8. The reflex mirror 3 is formed as a beam splitter or half-mirror. When lowered, some of the viewfinder light passes through the mirror and is reflected onto the sensing face of the element 8 by the shutter curtains 9 or 10 to enable the time display function. When the mirror is raised and the lens diaphragm 2 reduced, the light is again reflected from the curtains and/or film surface 11 onto the sensing element face to enable the time control function.

A hinged shield 13 may be provided to block light from entering the camera box 12 via the rangefinder lens 7 when the mirror 3 is raised, and dual sensing elements 8, 8' may be employed together with an additional reflecting mirror 15 and an angled or concave shield 13 ' to effect a uniform vertical light distribution sensitivity in both the display and control modes.

1 Claim, 8 Drawing Figures

DUAL-MODE LIGHT METER SYSTEM FOR SLR CAMERA USING BEAM-SPLITTING REFLEX MIRROR

BACKGROUND OF THE INVENTION

This invention relates to a light metering arrangement for a single lens reflex, focal plane shutter camera having an automatic exposure time control system.

Built in light metering devices for the automatic control of exposure time in a single lens reflex camera are well known in the art. Typically, after the reflecting mirror has been raised, light passing through the photographic lens and reflected by the shutter curtain or the film surface is detected by a light sensing element disposed at the lower or side surface of the mirror box. The output signal of the light sensing element, which is proportional to the brightness of the photographic object, is applied to a light meter circuit, and this signal, together with other exposure factors such as the film sensitivity and the aperture opening, is used to determine and control the exposure time.

In such conventional light meter arrangements, however, before the reflecting mirror is raised it completely blocks the light passing through the photographic lens from reaching the shutter curtain or the film surface, and it is therefore impossible to implement the initial exposure time display by utilizing the light sensing element described above. In order to overcome this difficulty, an additional light sensing element is typically provided in the optical path of the viewfinder system, to thereby enable a preliminary exposure time display before the reflecting mirror is raised. However, since two separate light sensing elements are required to individually implement exposure time control and exposure time display, the construction of the complete light meter system is intricate, it is difficult to accomodate both sensing elements in the limited interior space of the camera, and the overall cost of the camera is greatly increased.

SUMMARY OF THE INVENTION

To overcome the above-described difficulties accompanying the conventional light metering systems, this invention provides a system in which the light sensing element for exposure time control, which detects the light reflected by the shutter curtain or the film surface, and the light sensing element for initial exposure time display, may be replaced by one and the same light sensing element.

Such synergism is enabled by forming all or part of the reflecting mirror as a beam splitter or half-mirror, whereby with a lowered mirror and an open or wide lens aperture some of the viewing or range finding light passes through the mirror and is reflected by the closed shutter curtain onto a single light sensing element to implement the initial exposure time display. When the mirror is raised and the lens aperture is narrowed, the same sensing element detects a greater proportion of a smaller amount of light in the same manner, to thereby implement exposure time control during the actual photographic operation.

A hinged shield may be provided behind the mirror to block light from entering the camera therethrough via the viewfinder when the mirror is raised, and dual light sensing elements may yet be employed in a more sophisticated embodiment to implement a more uniform or even light distribution sensitivity.

DETAILED DESCRIPTION OF THE PREFERRED EMBODIMENTS

Figure 1:
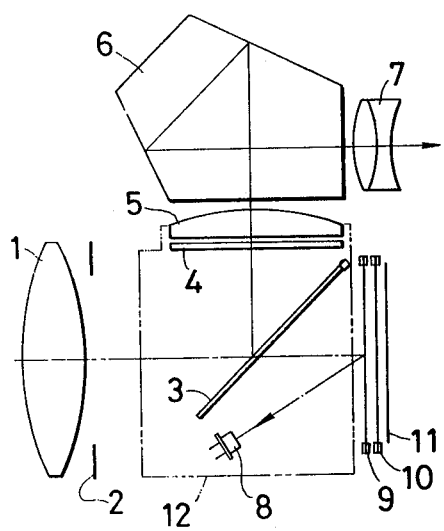
FIGS. 1 and 2 are sectional schematic views illustrating an embodiment of this invention with the reflex mirror lowered and raised, respectively.
Figure 2:
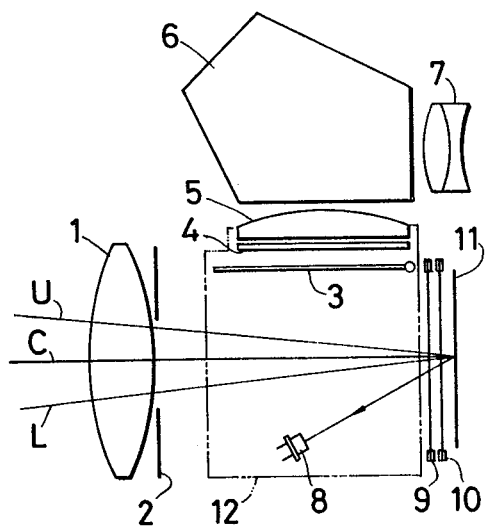

FIG. 1 shows an embodiment of a light meter system according to the invention, in which the reflecting mirror is lowered, while FIG. 2 shows the same embodiment with the reflecting mirror raised. Only the essential parts of the camera and light meter system are shown in these figures for the sake of simplicity.

FIGS. 1 and 2 show some of the more essential components of an SLR camera according to the invention including a photographic lens 1, an adjustable diaphragm or aperture opening 2, a reflex mirror 3 formed as a beam splitter or half-mirror, the whole or a part surface of which transmits a portion of the incident light passing through the lens 1 and reflects the remaining portion thereof, a Fresnel lens 4, a condenser lens 5, a penta-prism 6, an ocular viewing lens 7 forming a viewfinder optical system together with the lens 1, the diaphragm 2, and the mirror 3, a light sensing element 8, the leading curtain 9 of a focal plane shutter, the trailing curtain 10 of the shutter, a film 11, and a camera body or mirror box 12. The sensing element 8 is disposed at the lower part of the mirror box 12 in such a manner that the light receiving surface thereof faces toward the center of the shutter curtains 9, 10 and the film 11.

As is well known, light from a photographic object reaches the viewers eyes through the lens 1, the diaphragm 2, the mirror 3, the Fresnel lens 4, the condenser lens 5, the pentaprism 6 and the ocular lens 7, which components constitute an optical rangefinder system for the composition and focusing of the object. Since the reflecting mirror 3 is formed as a beam splitter, as described above, a portion of the light from the object passes through the mirror 3 to the leading shutter curtain 9, when the shutter is cocked, or to the trailing shutter curtain 10, after the shutter is released.

If the surfaces of the curtains 9 and 10 facing the lens 1 are provided with a suitable light reflecting characteristic according to exposure time control considerations, as will be described later, then some of the light reflected by the curtains is detected by the light sensing element 8. This sensed light can be employed as the input to a light meter circuit as being representative of the brightness of the object, and together with other exposure factors such as film sensitivity and aperture opening, enables the instrument to determine and display the correct exposure time.

In a picture taking mode, when the camera release button is depressed, the diaphragm 2 is reduced down to a preset stop value as shown in FIG. 2, and the mirror 3 is raised to its upper position. Light from the object passes through the lens 1 and the diaphragm 2 to the leading curtain 9 or the film 11, and is reflected onto the light sensing element 8 facing them. After a short delay to accomodate the response time of the sensing element and/or the light meter circuit, a trigger signal releases the leading shutter curtain 9 and actuates an exposure time delay circuit, whereby the exposure time is determined and controlled as a function of the light reflected from the curtain 9 or the film together with other exposure determining factors.

The differences between the functioning of the system in a time display mode and in a time control mode will now be described. If the reflecting characteristics of the surfaces of the curtains 9 and 10 are made substantially equal to those of the film 11, since the shutter curtains are disposed closely adjacent to the film, there is no significant difference in the optical path and optical characteristics as between the time display mode and the time control mode, except for the reduced quantity of light involved in the time display mode due to the presence of the lowered reflecting mirror 3. This difference (mirror attenuation) may easily be taken into account or compensated for by appropriate electronic circuitry within the system. In addition, by reason of the same light sensing element serving for both modes, the light receiving sensitivity distribution is therefore the same in both modes, and it is thus possible to provide an exposure time display based on the same light distribution characteristics used in the exposure time control.

Figure 3:
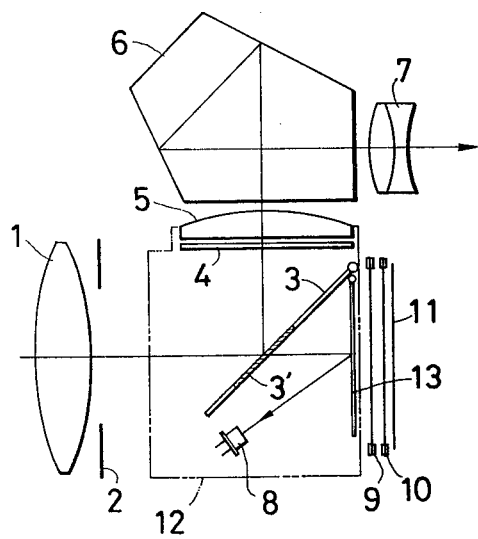
FIGS. 3, 4 and 5, 6 are similar sectional schematic views illustrating two further embodiments of the invention, respectively.
Figure 4:
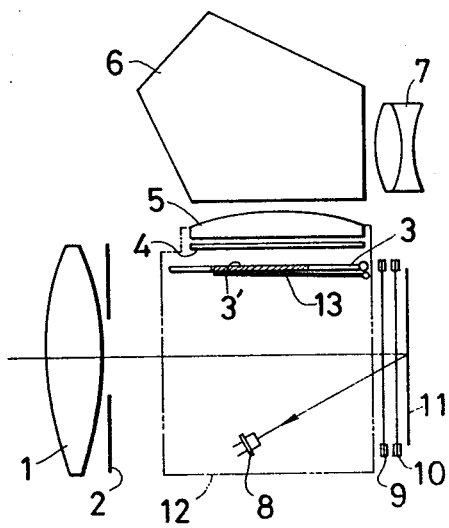

Another embodiment of the invention is shown in FIGS. 3 and 4. In this embodiment a light shielding plate covers the raised beam splitter portion of the mirror so that "reverse" light from the ocular lens 7 cannot enter the camera and reach the film 11 during the photographic operation. The descriptions of the corresponding parts appearing in FIGS. 1 and 2 have been omitted. In FIG. 3, a light shielding plate 13 is positioned in front of the leading shutter curtain 9. If the surface of the plate 13 facing the lens 1 is provided with a reflection characteristic equal or correlated to that of the film 11, the light which has passed through a beam splitting portion 3' of the mirror and been reflected by the plate 13 onto the light sensing element, may be employed as the object brightness signal for the exposure time display.

In the exposure time control mode, the diaphragm 2 is reduced down to a preset stop value by depressing the camera release button, as shown in FIG. 4, and when the reflecting mirror 3 is raised the light shielding plate 13 is also raised to cover the beam splitting portion 3'. Otherwise, the camera structure and functioning is essentially the same as in the embodiment of FIG. 2.

Figure 5:
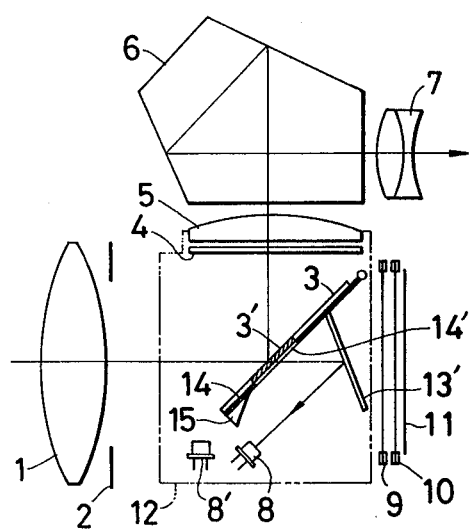
Figure 6:
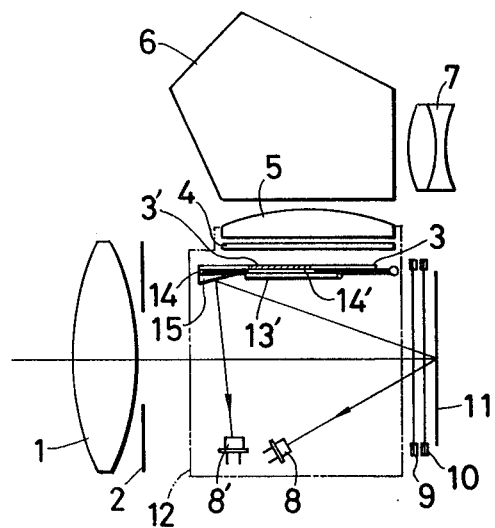

Another embodiment of the invention is shown in FIGS. 5 and 6, which relates to a reflex camera having an additional mirror and light sensing element to ensure a more accurate exposure time control regardless of the vertical light distribution of the photographic frame or object.

Figure 7:
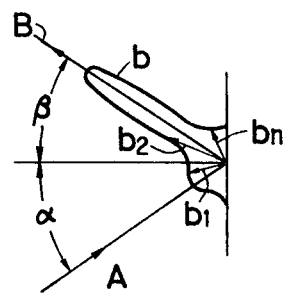
FIG. 7 is a graphical representation showing the relationships between an incident light beam and the reflected light beams thereof.

Referring first to the graphical representation showing an incident light beam and film reflected light beams of FIG. 7, A designates an incident light beam, $b_1, b_2 \ldots b_n$ are the reflected light beam vectors of the incident beam A, $b$ is an envelope obtained by connecting the peaks of the vectors $b_1, b_2 \ldots b_n$, and B designates the main reflected light beam. As is apparent from FIG. 7, the angle of incidence $\alpha$ of light beam A is equal to the angle of reflection $\beta$ of the main light beam B, and most of the reflected light beams are collected along the main light beam B. That is, the number of reflected light beams collected in directions other than that of the main reflection beam B is very small.

Figure 8:
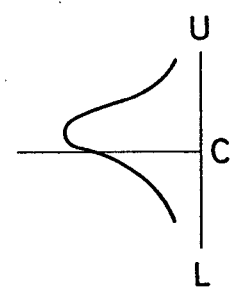
FIG. 8 is a graphical representation showing a light distribution sensitivity for a metering arrangement according to the invention.

Since the reflection characteristic of the film is as described above, in the light meter arrangements of FIGS. 1 through 4 the light sensing element 8, as shown in FIG. 2, receives the most light from the upper region U above the object. Less light is received by the sensing element from the central region C, and the least reflected light is received from the lower region L below the object. Therefore, if the object brightness is vertically uniform, the light distribution sensitivity is as shown in FIG. 8. That is, the light measurement emphasizes the upper region of the object. Thus, in a typical outdoors "sky above and earth below" frame, a slight underexposure of the central object may result.

A light meter arrangement in which the light distribution sensitivity of an object is uniform with respect to the photographic frame in the exposure time control mode, that is, the sensitivity is symmetrical with respect to the approximately central portion of the photographic frame, will now be described with reference to FIGS. 5 and 6. Reference numeral 14 designates a mounting frame for the reflecting mirror 3. The mounting frame 14 has an aperture 14' for passing light from the beam splitting portion 3' of the mirror 3. Reference numeral 13' is a light shielding plate hinged to the frame 14 and disposed to reflect light passing through the mirror 3 onto a first light sensing element 8. When the reflecting mirror is raised, the plate 13' covers the beam splitting portion 3'. The light shielding plate 13' and the shutter screens 9 and 10 constitute the reflecting means.

If the mounting angle and dimensions of the light shielding plate 13' are suitably selected, or if its reflecting surface is formed with the proper concavity, the exposure time display will have substantially the same vertical light distribution sensitivity as the exposure time control, as described below. That is, disposing the reflecting surface of the plate 13' at an angle with respect to the curtains 9, 10 and film 11 has the effect of lowering the sensitivity bulge of FIG. 8 to be symmetrical about the abscissa.

In FIG. 6 the diaphragm 2 has been reduced down to a preset stop value by depressing the release button, and the mirror 3 has been raised. The beam splitting portion 3' is covered by the light shielding plate 13' to block any light from entering the camera box through the ocular lens 7. A small reflecting mirror 15 is provided on the lower rear side of the mounting frame 14. The mounting angle of the mirror 15 is selected so that it receives light reflected from the shutter curtain 9 or the film 11 and directs it to a second light sensing element 8' mounted at the lower part of the mirror box 12. In contrast to the first light sensing element 8, the second light sensing element 8' receives most of its light from the lower region L below the object, less light from the central region C and the least light from the upper region U. Thus, if the output signal from the first light sensing element 8 is added to the output signal from the second light sensing element 8', their two lopsided sensitivity distributions effectively offset each other and an exposure time control can be achieved wherein the light distribution sensitivity is substantially symmetrical with respect to the photographic frame.

In the above description, the small reflecting mirror 15 is shown as being mounted on the frame 14 of the mirror 3; however, it may also be secured to a separate movable member which reaches the same position as shown in FIG. 6 when the mirror 3 is raised. In addition, if the mounting angle of the mirror 15, and the positions or inclinations of the light sensing elements are suitably selected, although not shown, the apparatus can still be designed so that one and the same light sensing element receives both the light reflected directly by the shutter curtain or the film, and the light reflected by the mirror 15. Thus, even in the embodiment of FIGS. 5 and 6, it is still possible to replace the two sensing elements with a single, dual mode element.

What is claimed is:

1. In a single lens reflex camera including a main reflecting mirror movable between raised and lowered positions within a camera box, a viewfinder optical system disposed to receive light reflected from the lowered mirror, reflecting means disposed at the rear of the box closely adjacent to and in front of film means and a light sensing element disposed within the box to implement an automatic exposure time control function in response to light reflected back from the reflecting means and/or the film means after the mirror is raised, the improvement characterized by having at least a portion of the reflecting mirror being formed as a beam splitter whereby some light passes through the lowered mirror and is reflected back onto the sensing element by said reflecting means to implement an initial exposure time display function, said reflecting means including a shield member mounted within the box and movable between a light reflecting position in front of said film means when the mirror is lowered and a light blocking position beneath the mirror when the latter is raised so that the shield member prevents light from entering the camera box via the viewfinder optical system when the mirror is raised, said shield member being mounted to lie at an inclined angle to the film means when in its light reflecting position to implement a uniform light distribution sensitivity for the exposure time display function, a further light sensing element disposed within the box and a further reflecting mirror movable to a position proximate that of the main reflecting mirror when the latter is raised, said further reflecting mirror being operable to direct light reflected back from the reflecting means and/or the film means onto the further light sensing element whereby the combined outputs of the two light sensing elements implement a uniform light distribution sensitivity for the exposure time control function.

* * * * *